(12) United States Patent
McCloy et al.

(10) Patent No.: US 11,852,053 B2
(45) Date of Patent: Dec. 26, 2023

(54) ELECTRICALLY-ACTUATED CAMSHAFT PHASER WITH BACKLASH REDUCTION

(71) Applicant: BorgWarner Inc., Auburn Hills, MI (US)

(72) Inventors: Chad McCloy, Cortland, NY (US);
Daniel Brown, Freeville, NY (US);
Mark Wigsten, Lansing, NY (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 17/323,451

(22) Filed: May 18, 2021

(65) Prior Publication Data
US 2022/0372896 A1 Nov. 24, 2022

(51) Int. Cl.
*F01L 1/352* (2006.01)
*F01L 9/22* (2021.01)
(Continued)

(52) U.S. Cl.
CPC ............... *F01L 1/352* (2013.01); *F01L 1/047* (2013.01); *F01L 9/22* (2021.01); *F16H 1/2863* (2013.01); *F01L 2820/032* (2013.01)

(58) Field of Classification Search
None
See application file for complete search history.

(56) References Cited

U.S. PATENT DOCUMENTS 5,336,137 A * 8/1994 Kawakita ............. B60N 2/2251
297/362
9,512,900 B2 12/2016 Hederstad et al.
(Continued)

FOREIGN PATENT DOCUMENTS

CN 102297257 A 12/2011
CN 106195134 A 12/2016
(Continued)

OTHER PUBLICATIONS

JP-2010169226-A English Language Machine Translation (Year: 2010).*
(Continued)

*Primary Examiner* — Wesley G Harris
(74) *Attorney, Agent, or Firm* — REISING ETHINGTON P.C.

(57) ABSTRACT

An electrically-actuated variable camshaft timing (VCT) phaser assembly, comprises a sun gear configured to receive input from an electric motor and one or more planet gears having radially-outwardly-extending gear teeth that engage the sun gear; a first ring gear, having radially-inwardly extending gear teeth that engage the radially-outwardly-extending gear teeth of the sun gear, configured to receive rotational output provided by a crankshaft; a second ring gear, having radially-inwardly extending gear teeth that engage the radially-outwardly-extending gear teeth of the sun gear, configured to couple to a camshaft; one or more planet gear pins that carry the planet gear(s) and engage a planetary gear set to prevent the relative rotation of the planet gear pin(s) relative to the planetary gear set; and one or more springs that bias the planet gear pin(s) and the planetary gear(s) toward the first ring gear and the second ring gear.

18 Claims, 6 Drawing Sheets

(51) Int. Cl.
  *F16H 1/28*    (2006.01)
  *F01L 1/047*   (2006.01)

(56) References Cited

U.S. PATENT DOCUMENTS

| | | | |
|---|---|---|---|
| 10,006,321 B2 * | 6/2018 | Simpson | F01L 1/34 |
| 10,294,831 B2 | 5/2019 | Burke et al. | |
| 10,344,825 B2 | 7/2019 | Wigsten | |
| 10,605,332 B2 * | 3/2020 | Pluta | F16H 57/082 |
| 2007/0163526 A1 * | 7/2007 | Sugiura | F01L 1/352 |
| | | | 123/90.17 |
| 2015/0126326 A1 * | 5/2015 | Kobayashi | F16D 43/02 |
| | | | 475/331 |
| 2016/0327124 A1 * | 11/2016 | McCloy | F01L 1/344 |
| 2016/0348759 A1 * | 12/2016 | McCloy | F16H 1/2863 |
| 2016/0348760 A1 * | 12/2016 | Wigsten | F16H 1/2863 |
| 2018/0371963 A1 | 12/2018 | Burke et al. | |

FOREIGN PATENT DOCUMENTS

| | | | | |
|---|---|---|---|---|
| CN | 107750313 A | | 3/2018 | |
| CN | 110785544 A | | 2/2020 | |
| JP | 2010169226 A | * | 8/2010 | ........... F16H 57/082 |
| WO | 2020180829 A1 | | 9/2020 | |

OTHER PUBLICATIONS

Chinese Office Action for Chinese Application No. 202210522186.1 dated May 29, 2023 (10 pages).
English Translation of Chinese Office Action for Chinese Application No. 202210522186.1 dated May 29, 2023 (11 pages).

\* cited by examiner

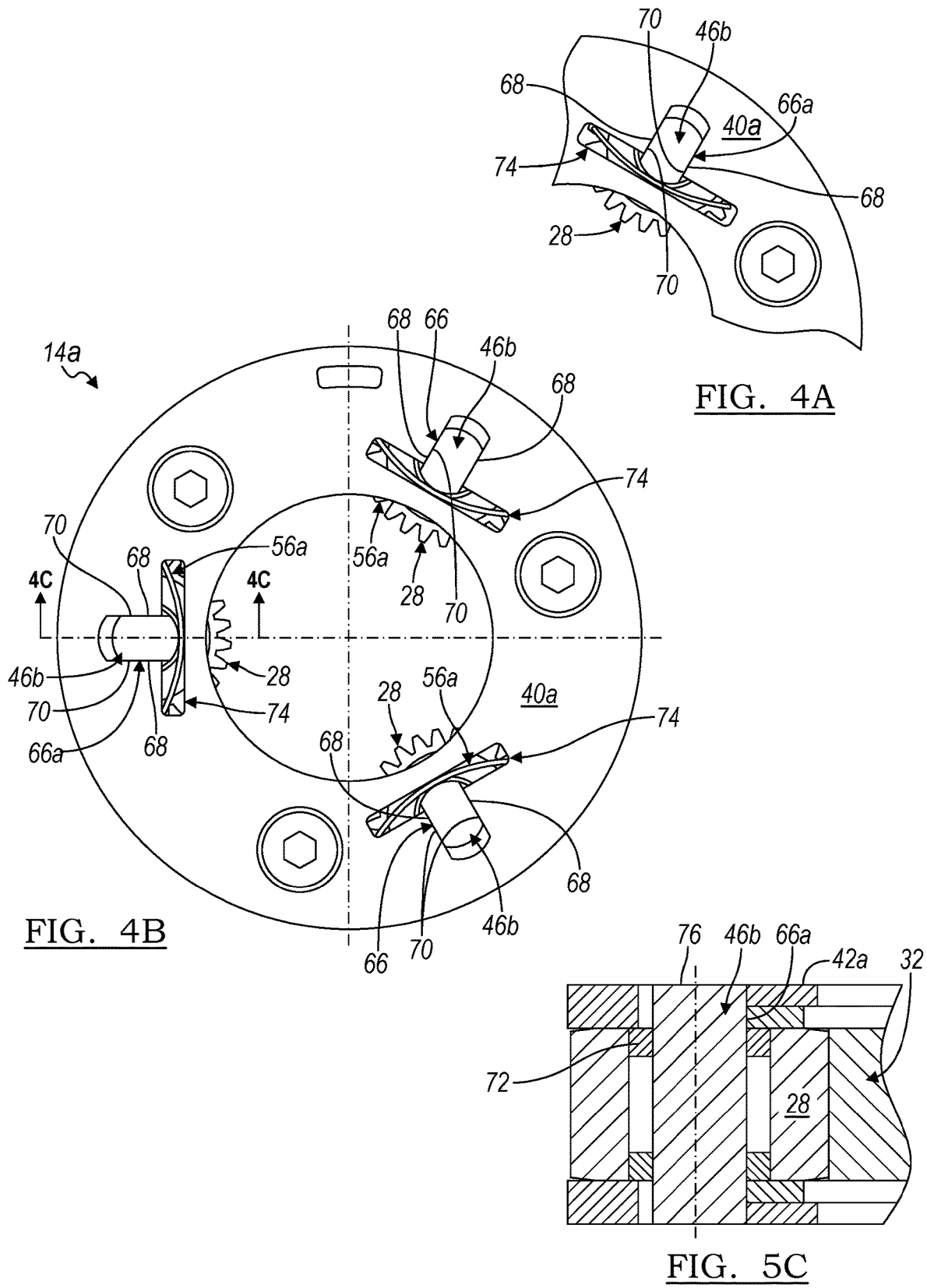

ELECTRICALLY-ACTUATED CAMSHAFT PHASER WITH BACKLASH REDUCTION

TECHNICAL FIELD

The present application relates to variable valve timing (VVT) for internal combustion engines (ICEs) and, more particularly, relates to variable camshaft timing (VCT) phasers equipped on ICEs.

BACKGROUND

Variable valve timing (VVT) systems are commonly used with internal combustion engines—such as those found in automobiles—for controlling intake and exhaust valve opening and closing. The VVT systems can help improve fuel economy, reduce exhaust emissions, and enhance engine performance, among other benefits. One type of VVT system employs a variable camshaft timing (VCT) phaser. In general, VCT phasers dynamically adjust the rotation of engine camshafts relative to engine crankshafts in order to advance or retard the opening and closing movements of intake and exhaust valves. In recent years, VCT phasers have used an electric motor and a planetary gear set. These electrically-actuated VCT phasers, or camshaft phasers, can include planetary gear sets that engage multiple ring gears.

SUMMARY

In one implementation, an electrically-actuated variable camshaft timing (VCT) phaser assembly, comprises a sun gear configured to receive input from an electric motor and one or more planet gears having radially-outwardly-extending gear teeth that engage the sun gear; a first ring gear, having radially-inwardly extending gear teeth that engage the radially-outwardly-extending gear teeth of the planet gear(s), configured to receive rotational output provided by a crankshaft; a second ring gear, having radially-inwardly extending gear teeth that engage the radially-outwardly-extending gear teeth of the planet gear(s), configured to couple to a camshaft; one or more planet gear pins that carry the planet gear(s) and engage a planetary gear set to prevent the relative rotation of the planet gear pin(s) relative to the planetary gear set; and one or more springs that bias the planet gear pin(s) and the planetary gear(s) toward the first ring gear and the second ring gear.

In another implementation, an electrically-actuated VCT phaser assembly, comprises a sun gear configured to receive input from an electric motor and one or more planet gears having radially-outwardly-extending gear teeth that engage the sun gear; a first ring gear, having radially-inwardly extending gear teeth that engage the radially-outwardly-extending gear teeth of the sun gear, configured to receive rotational output provided by a crankshaft; a second ring gear, having radially-inwardly extending gear teeth that engage the radially-outwardly-extending gear teeth of the sun gear, configured to couple to a camshaft; an outer carrier plate having apertures; an inner carrier plate having apertures; one or more planet gear pins that engage the inner carrier plate or the outer carrier plate to prevent the relative rotation of the planet gear pins relative to the planetary gear set, wherein the planet gear pins are received by the apertures that permit radial movement of the planet gear pins; one or more spring slots in the outer carrier plate and the inner carrier plate; and one or more springs, received by the spring slots in the outer carrier plate and the inner carrier plate, that bias the planet gear pin(s) and the planetary gear(s) toward the first ring gear and the second ring gear.

In yet another implementation, an electrically-actuated VCT phaser assembly, comprises a sun gear configured to receive input from an electric motor and one or more planet gears having radially-outwardly-extending gear teeth that engage the sun gear; a first ring gear, having radially-inwardly extending gear teeth that engage the radially-outwardly-extending gear teeth of the planet gear(s), configured to receive rotational output provided by a crankshaft; a second ring gear, having radially-inwardly extending gear teeth that engage the radially-outwardly-extending gear teeth of the planet gear(s), configured to couple to a camshaft; an outer carrier plate; an inner carrier plate; apertures in the outer carrier plate and the inner carrier plate, wherein each aperture includes a radially-extending tab; one or more planet gear pin(s) that engage the radially-extending tab to prevent the relative rotation of the planet gear pins relative to the outer carrier plate and the inner carrier plate, wherein the planet gear pins are received by the apertures that permit radial movement of the planet gear pins; and a spring that biases the planet gear pin(s) and the planetary gear(s) toward the first ring gear and the second ring gear.

BRIEF DESCRIPTION OF THE DRAWINGS

FIG. 4a is a profile view depicting a portion of an implementation of an electrically-actuated VCT phaser assembly;

FIG. 4b is a profile view depicting a portion of an implementation of an electrically-actuated VCT phaser assembly;

FIG. 5c is a cross-sectional view depicting a portion of an implementation of an electrically-actuated VCT phaser assembly;

DETAILED DESCRIPTION

Electrically-actuated variable camshaft timing (VCT) phaser assemblies include a planetary gear set that couples to an output of an electric motor and a camshaft. The rotation of the output shaft of the electric motor can be communicated through the planetary gear set to the camshaft. However, the planet gears included in the planetary gear set can include a degree of compliance between the planet gears and ring gears that they engage. A spring can bias the planet gear into engagement with the ring gear(s). In particular, the planet gear can rotate about a planet pin that engages with the planetary gearbox such that the planet pin does not rotate relative to the planetary gear set that the planet gear rotates about the pin. In some implementations, the spring can positively link the planet pin to the planetary gear set to prevent relative rotation between pin and gear set. Additionally, the spring can be isolated from the planet gear such that the spring and planet gear do not contact each other. This can minimize wear in contrast to other implementations in which the spring directly engages the planet gear.

The figures illustrate embodiments of an electrically-actuated VCT phaser assembly 10—also referred to as a camshaft phaser—that can be used with an internal combustion engine (ICE) like those found in automotive applications. The VCT phaser assembly 10 controls intake and exhaust valve opening and closing in the ICE. The VCT phaser assembly 10 dynamically adjusts the rotation of the ICE's camshaft relative to the ICE's crankshaft for advancing or retarding the opening and closing movements of the intake and exhaust valves. The VCT phaser assembly 10 is of the type that employs an electric motor 12 and a planetary gear set 14 with multiple ring gears. While described below in more detail, a degree of compliance is incorporated into the design and construction of the planetary gear set 14 in order to—in concert with one or more springs—minimize a backlash condition sometimes experienced among gears of the planetary gear set 14. The spring(s) acts to bias the gears of the planetary gear set 14 into engagement with one another. Noise, vibration, and harshness (NVH) is also minimized. Further, as used herein, the terms axially, radially, and circumferentially, and their related grammatical forms, are used in reference to the generally circular shape of the shown VCT phaser assembly and some of its components. In this sense, axially refers to a direction that is generally along or parallel to a central axis of the circular shape, radially refers to a direction that is generally along or parallel to a radius of the circular shape, and circumferentially refers to a direction that is generally along or in a similar direction as a circumference of the circular shape.

Figure 1:
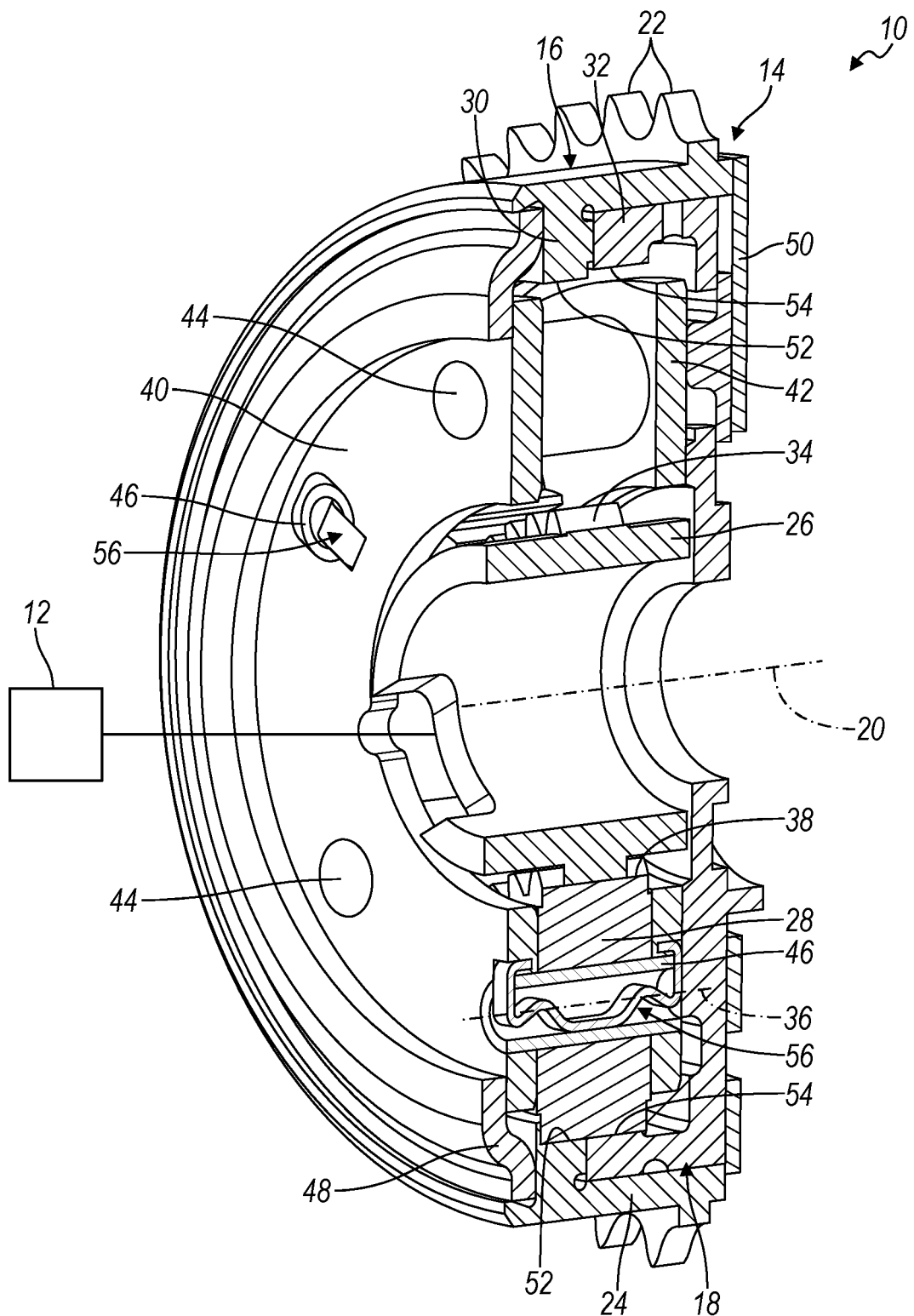
FIG. 1 is a cross-sectional view depicting an implementation of an electrically-actuated variable camshaft timing (VCT) phaser assembly.

The VCT phaser assembly 10 can have various designs and constructions in various embodiments depending upon, among other possible factors, the particular application in which the VCT phaser assembly 10 is employed and the crankshaft and camshaft that it works with. In the embodiment presented in FIG. 1, for example, the VCT phaser assembly 10 includes a planetary gear set 14, a sprocket 16, and a cam plate 18. The example of FIG. 1 is used, in general, for describing components of an example VCT phaser assembly. The spring(s) described below with reference to FIGS. 2-7 and the accompanying constructions can be incorporated into a VCT phaser assembly such as that of FIG. 1. The VCT phaser assembly can have more, less, and/or different components than those described herein. In FIG. 1, the sprocket 16 receives rotational drive input from the ICE's crankshaft and rotates about an axis 20. A timing chain or timing belt can be looped around the sprocket 16 and around the ICE's crankshaft so that rotation of the crankshaft translates into rotation of the sprocket 16. In this example, at an exterior the sprocket 16 has a set of teeth 22 for mating with the timing chain. Further, the sprocket 16 has a cylindrical wall 24.

Still referring to FIG. 1, the planetary gear set 14 includes a sun gear 26, planet gears 28, and a first ring gear 30 and a second ring gear 32. The sun gear 26 is connected to the electric motor 12 and is driven by the electric motor 12 for rotation about the axis 20. The connection between the sun gear 26 and electric motor 12 can be made via a pin and slot interconnection or some other way. The sun gear 26 engages with the planet gears 28 and has a set of teeth 34 at its exterior for making direct teeth-to-teeth meshing with the planet gears 28. The planet gears 28 rotate about their individual rotational axes 36 when in the midst of bringing the ICE's camshaft to and from its advanced and retarded angular positions. When not advancing or retarding, on the other hand, the planet gears 28 revolve together around the axis 20 with the sun gear 26 and with the ring gears 30, 32. In the embodiment presented here, there are a total of three planet gears 28 that are similarly designed and constructed, but there could be other quantities of planet gears such as two or four or six. Also, the planet gears may differ from each other. Each planet gear 28 engages with the first and second ring gears 30, 32, and each planet gear 28 has a set of teeth 38 at its exterior for making direct teeth-to-teeth meshing with the ring gears 30, 32. A carrier assembly holds the planet gears 28 in place at the interior of the VCT phaser assembly 10 and includes an outer carrier plate 40, an inner carrier plate 42, carrier pins 44, and planet gear pins 46. The planet gear pins 46 carry the planet gears 28. In this implementation, the planet gear pins 46 are shown as being solid but it should be appreciated that in other implementations some or all of the planet gear pins can be hollow having an inner cavity. Furthermore, an outer retaining plate 48 extends between the cylindrical wall 24 and the outer carrier plate 40, and an inner retaining plate 50 is situated opposite the outer retaining plate 48.

The first ring gear 30 receives rotational drive input from the sprocket 16 so that the first ring gear 30 and sprocket 16 rotate together about the axis 20 in operation. In this embodiment the first ring gear 30 is a unitary extension of the sprocket 16, but the components could be discrete and connected together in other embodiments such as by bolts, welds, interfitting cutouts and tabs, and/or some other way. The first ring gear 30 engages with the planet gears 28 and has a set of teeth 52 at its interior for making direct teeth-to-teeth meshing with the planet gears 28. The second ring gear 32 drives rotation of the cam plate 18 and the two components rotate together about the axis 20 in operation. In this embodiment the second ring gear 32 is a unitary extension of the cam plate 18, but the components could be discrete and connected together in other embodiments such as by bolts, welds, interfitting cutouts and tabs, and/or some other way. The second ring gear 32 engages with the planet gears 28 and has a set of teeth 54 at its interior for making direct teeth-to-teeth meshing with the planet gears 28. Furthermore, with respect to each other, the number of individual teeth between the first and second ring gears 30, 32 can differ such as by a multiple of the number of planet gears 28 present in the planetary gear set 14. Satisfying this relationship furnishes the advancing and retarding capabilities by imparting relative rotational movement and relative speed between the first and second ring gears 30, 32.

Together, the two ring gears 30, 32 constitute a split ring gear construction of the planetary gear set 14. Still, the planetary gear set 14 could include more than two ring gears. For example, the planetary gear set 14 could include an additional third ring gear for a total of three ring gears in the planetary gear set 14. Here, the third ring gear could also drive rotation of the cam plate 18 like the second ring gear 32, and could have the same number of individual teeth as the second ring gear 32. Lastly, the cam plate 18 can be connected to the ICE's camshaft and drives rotation of the ICE's camshaft about the axis 20.

Figure 2:
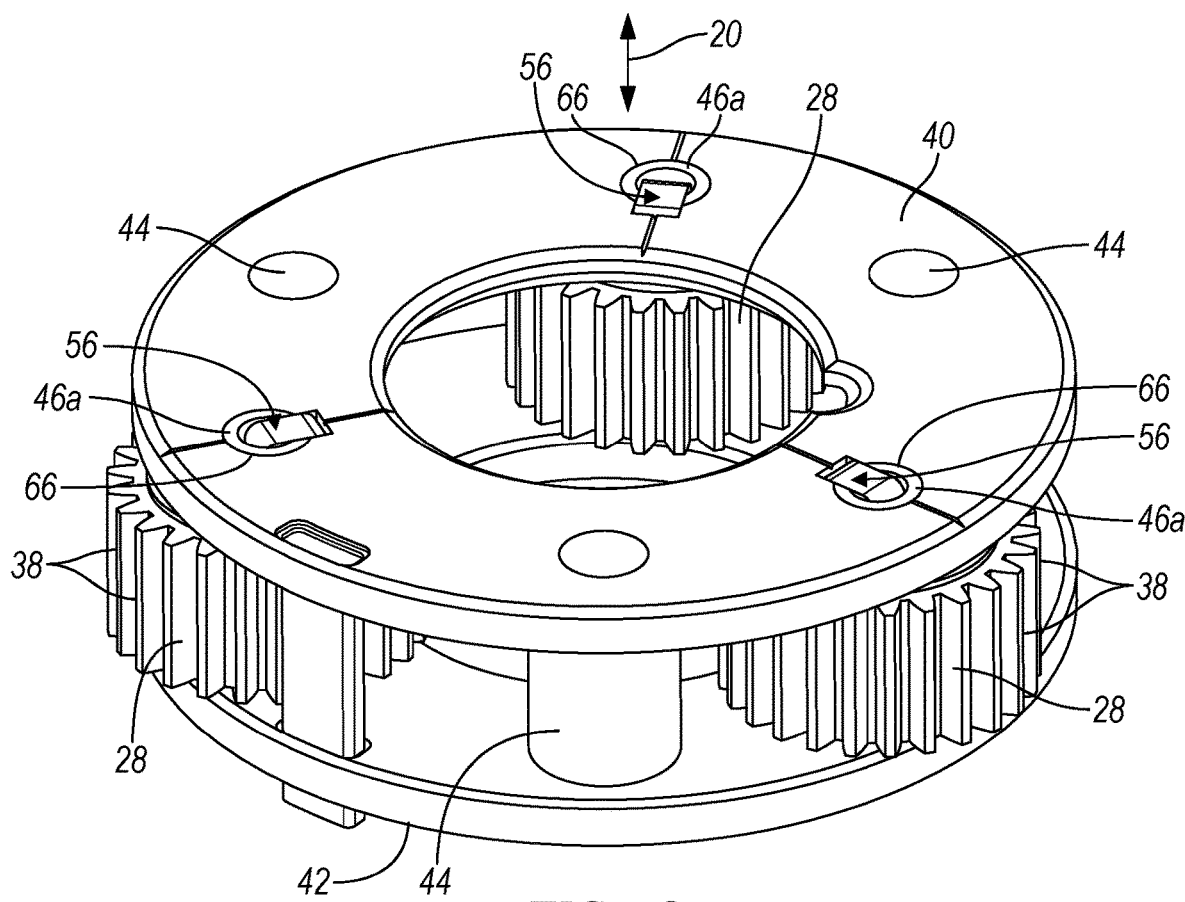
FIG. 2 is a perspective view depicting a portion of an implementation of an electrically-actuated VCT phaser assembly.
Figure 3:
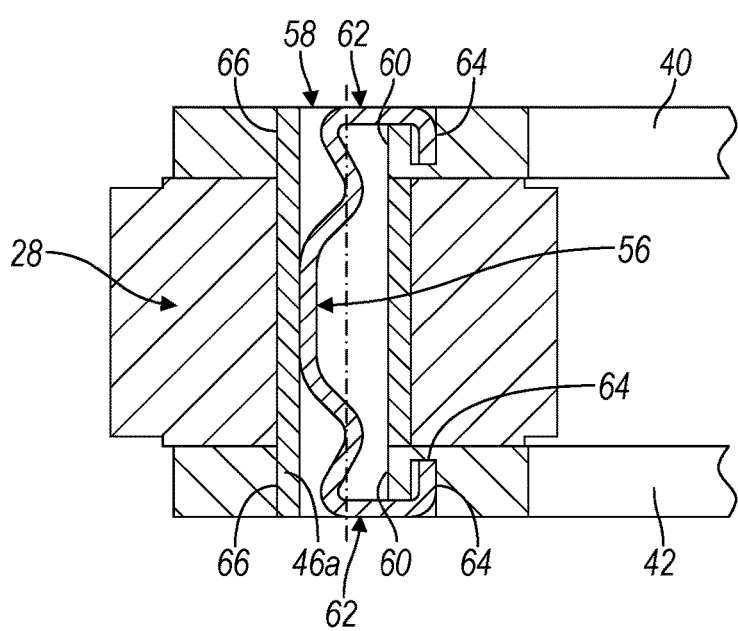
FIG. 3 is a cross-sectional view depicting a portion of an implementation of an electrically-actuated VCT phaser assembly.

Turning to FIGS. 2 and 3, an implementation of a spring 56 engaging a planet gear pin 46a is shown. The planet gear pin 46a can extend from an aperture in the outer carrier plate 40 to an aperture in the inner carrier plate 42. The planet gear pin 46a can be tubular in shape such that it includes an inner cavity 58 capable of receiving the spring 56. The planet gear pin 46a can include a relief section 60 that permits distal ends 62 of the spring 56 to extent radially outwardly from the pin 46a so that the ends 62 can securely engage notches 64 in the outer carrier plate 40 and the inner carrier plate 42. The notches 64 can be slots or openings in the plates 40, 42 having a similar shape as the cross-section of the spring 56. The combination of the distal ends 62 engaging the notches 64 and a portion of the spring 56 engaging the relief section 60 can prevent the rotation of the planet gear pin 46a relative to the planetary gear set 14 while permitting the rotation of the planet gear 28 relative to the planet gear pin 46a.

The apertures 66 in the plates 40, 42 receiving the planet gear pin 46a can have a larger diameter than the outer diameter of the pin 46a thereby permitting the pin 46a to move radially relative to the axis of rotation 20 toward the first ring gear 30 and the second ring gear 32. The spring 56 and its engagement with the planetary gear set 14 and planet gear pin 46a can opposably bias the planet gear 28 relative to the gear set 14 into engagement with the first ring gear 30 and the second ring gear 32.

FIGS. 4a-4b depict another implementation of a planetary gear set 14a having planet gears 28, planet gear pins 46b, and planet bushings 72 between the planet gears 26 and the planet gear pins 46b. The outer carrier plate 40a and the inner carrier plate 42a include non-circular apertures 66a that receive the planet gear pins 46b. In this implementation, the non-circular apertures 66a can include planar surfaces 68 that engage corresponding planar surfaces 70 of the planet gear pins 46b. The non-circular apertures 66a can permit the planet gear pins 46b to move radially relative to the axis of rotation 20 thereby helping the planet gears 28 engage the ring gears 30, 32. The outer carrier plate 40a and the inner carrier plate 42a can include spring slots 74 that intersect with the non-circular apertures 66a. The spring slots 74 can be configured to receive a spring 56a in the form of a planar biasing element, such as a leaf spring. The spring 56a can engage a distal end 76 of the planet gear pins 46b as well as a portion of the spring slot 74 to bias the pins 46b toward the ring gears 30, 32 and away from the axis of rotation 20. In this implementation, the outer carrier plate 42a and the inner carrier plate 40a can each include three spring slots 74 so that each planet gear pin 46b is biased by two springs 56a. However, other implementations having different quantities or combinations of planet gears, spring slots, and springs are possible. For example, a subset of planet gears may be provided with a moveable pin urging the subset of planet gears outward into the ring gears. Furthermore, it should also be appreciated that implementation of planetary gear sets using the springs are possible without using planetary bushings, including replacing the bushings with roller bearings, or permitting direct contact between the planet gear 28 and the pin 46b.

Figure 5A:
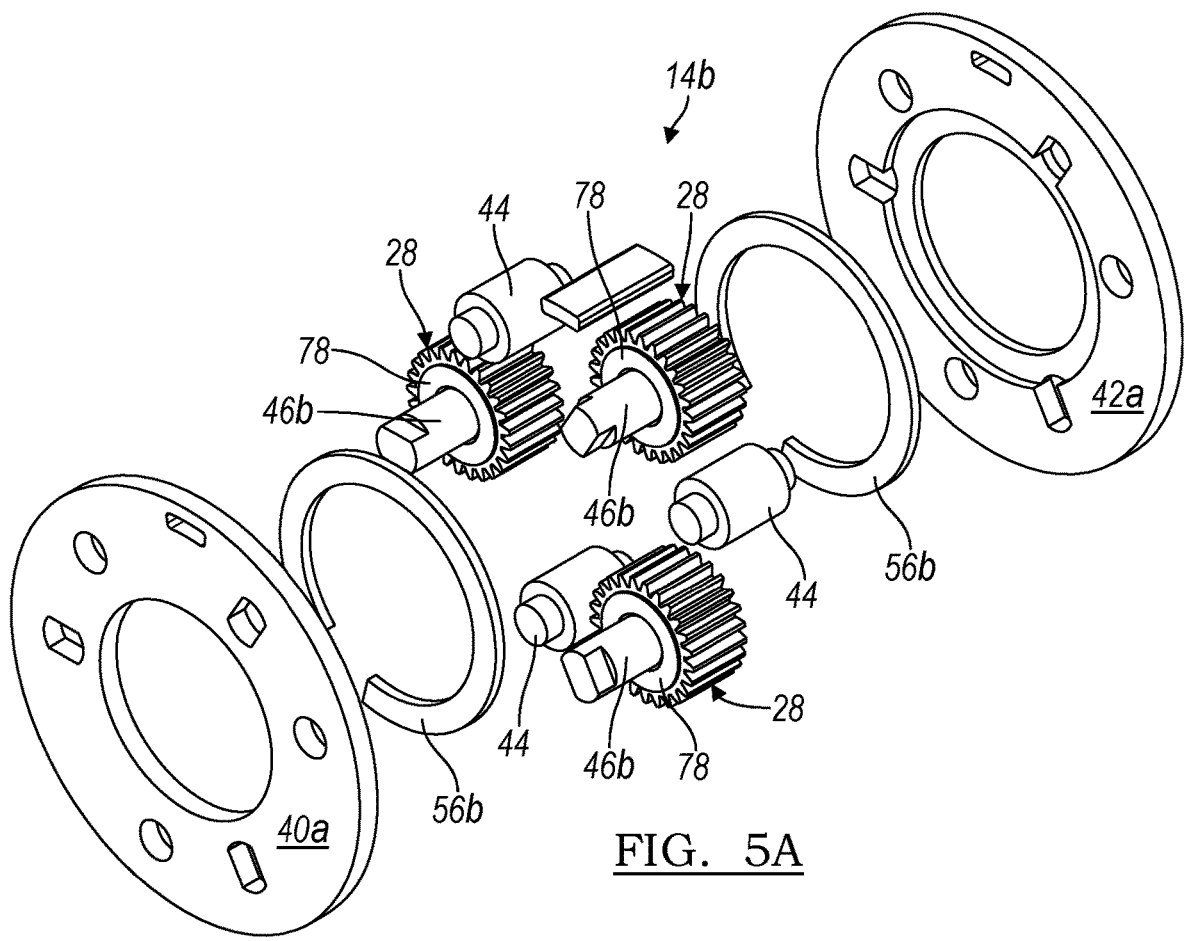
FIG. 5a is an exploded view depicting a portion of an implementation of an electrically-actuated VCT phaser assembly.
Figure 5B:
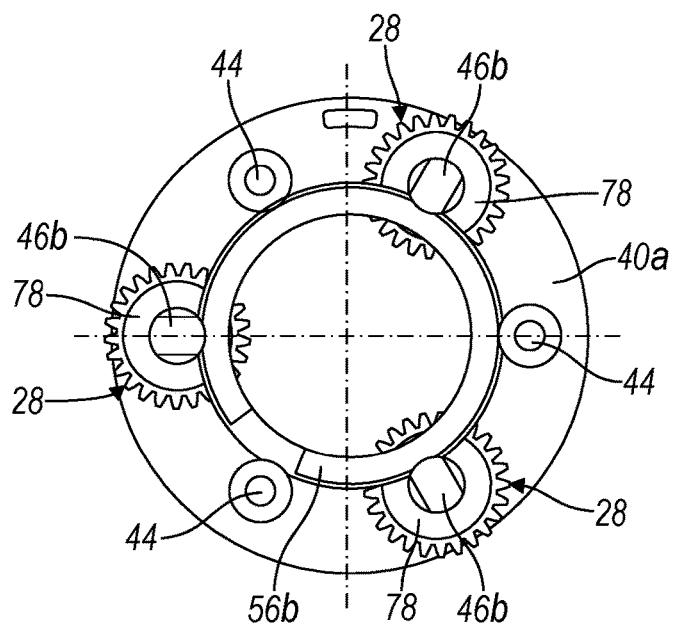
FIG. 5b is a profile view depicting a portion of an implementation of an electrically-actuated VCT phaser assembly.

Turning to FIGS. 5a-5c, another implementation of a planetary gear set 14b is shown. The planetary gear set 14b includes planet gears 28, planet gear pins 46b, and springs 56b implemented as snap rings. In contrast, past designs that incorporated freely rotating pins relative to the carrier plate and snap rings as springs could be susceptible to increased levels of wear. One spring 56b or snap ring can be positioned between the outer carrier plate 40a and a radial surface 78 of the planet gears 26 and another spring/snap ring 56b, can be positioned between the inner carrier plate 42a and another radial surface 78 of the planet gears 28. The springs 56b can engage distal ends 76 of the planet gear pins 46b to bias the pins 46b toward the ring gears 30, 32.

Figure 6A:
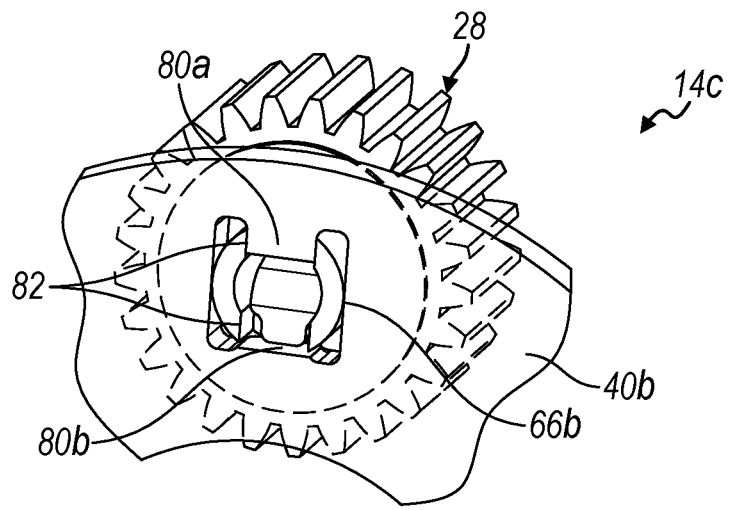
FIG. 6a is a perspective view depicting a portion of an implementation of an electrically-actuated VCT phaser assembly.
Figure 6B:
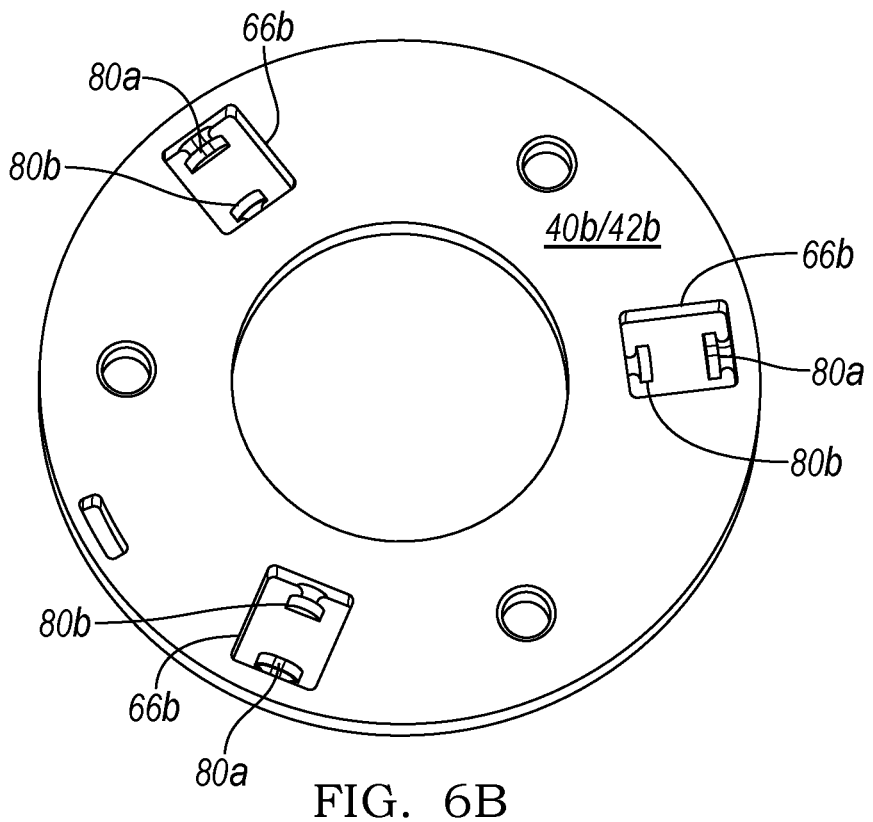
FIG. 6b is a perspective view depicting a portion of an implementation of an electrically-actuated VCT phaser assembly.
Figure 6C:
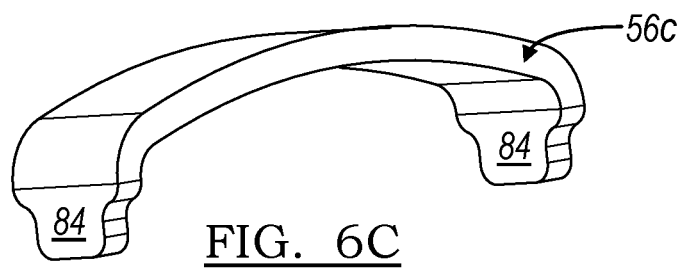
FIG. 6c is a perspective view depicting a portion of an implementation of an electrically-actuated VCT phaser assembly.

Another implementation of a planetary gear set is shown in FIGS. 6a-6c. The planetary gear set 14c includes planet gears 28, planet gear pins 46c, an outer carrier plate 40c, and an inner carrier plate 42c. The outer carrier plate 40c and inner carrier plate 42c include non-circular apertures 66b for receiving the planet gear pins 46c and preventing the rotation of the pins 46c relative to the plates 40c, 42c. In this implementation, the outer carrier plate 40c and the inner carrier plate 42c include radially-extending tabs 80. Tab 80a can extend radially toward the axis of rotation 20 within the non-circular aperture 66b to engage the distal end of the pin 46c to prevent relative rotation of the pins 46c relative to the plate 40b/42b. Another tab 80b can extend radially away from the axis of rotation 20 within the non-circular aperture 66b to engage the distal end of the pin 46c. The tab 80b can be positioned axially inward relative to the other tab 80, toward the planetary gear set 14c. The position of tab 80b can accommodate the existence of a distal end of a spring 56c. The planet gear pins 46c can be hollow having an inner diameter and an outer diameter. The planet gear pins 46c can also include notches 82 in the pin ends such that the pins 46c have an arc section of the pin ends along which the overall length of the pin 46c is reduced. The notches 82 can be shaped to positively engage the tabs 80 of the non-circular apertures 66c to prevent the rotation of the pins 46c relative to the planetary gear set 14c. The spring 56c can be implemented as a leaf spring with angled distal ends 84 and received within the hollow inner diameter of the planet gear pins 46c. The angled distal ends 84 of the spring 56c can engage an end of one of the tabs 80b of the non-circular apertures 66b as the spring 56c is inserted into the pin 46c. Once fully inserted, the distal end 84 can engage the tab 80b. The geometry of the tab 80b can be selected to minimize deformation of the spring 56c during assembly and also control the spring force exerted by the spring 56c on the planet gear pin 46c. That is, the length of the tab 80b is selected based on an amount of spring preload after assembly and/or spring deformation during assembly. In some implementations, the spring can be used to prevent rotation of the pins 46 relative to the carrier plates 40, 42

Figure 7A:
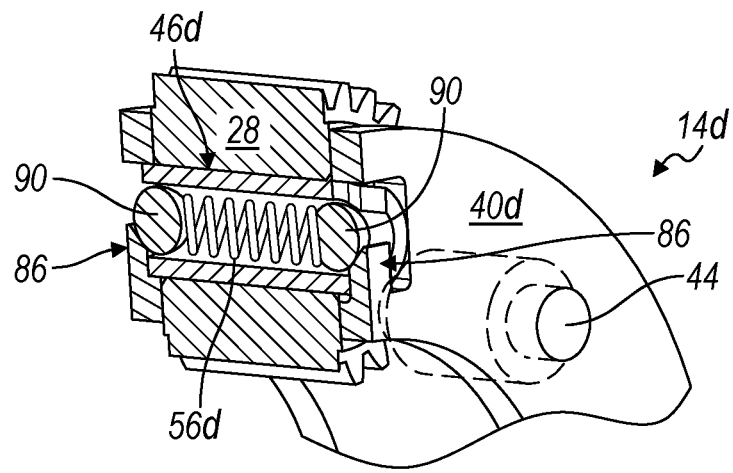
FIG. 7a is a cross-sectional view depicting a portion of an implementation of an electrically-actuated VCT phaser assembly.
Figure 7B:
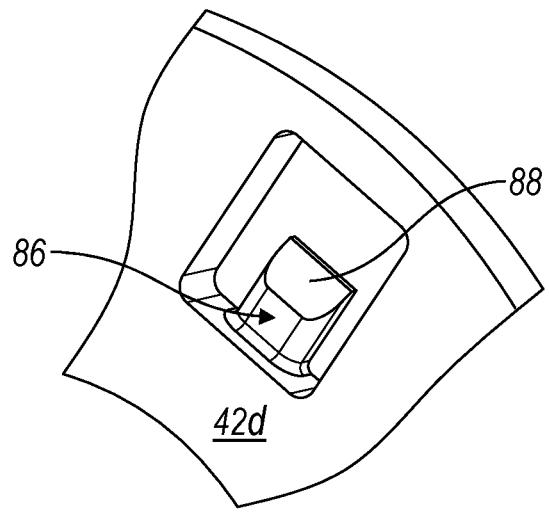
FIG. 7b is a perspective view depicting a portion of an implementation of an electrically-actuated VCT phaser assembly.
Figure 7C:
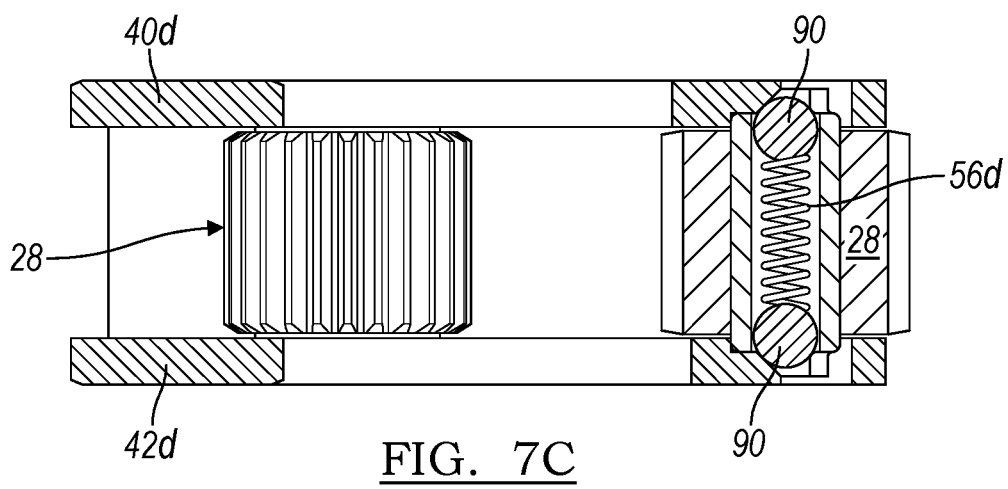
FIG. 7c is a cross-sectional view depicting a portion of an implementation of an electrically-actuated VCT phaser assembly.

Turning to FIGS. 7a-7c, another implementation of a planetary gear set 14d is shown. The planetary gear set 14d includes planet gears 28, planet gear pins 46c, an outer carrier plate 40b, and an inner carrier plate 42b. The outer carrier plate 40b and inner carrier plate 42b include non-circular apertures 66c for receiving the planet gear pins 46d and preventing the rotation of the pins 46d relative to the plates 40b, 42b. In this implementation, the outer carrier plate 40b and inner carrier plate 42b include a radially-extending tab 86. The tab 86 can extend radially away from the axis of rotation 20 within the non-circular aperture 66*c*. The planet gear pins 46*d* can be hollow having an inner diameter and an outer diameter. The planet gear pins 46*d* can also include notches 82 in one of the pin ends such that the pins 46*d* have an arcuate length of the pin ends along which the overall length of the pin 46*d* is reduced. The notches 82 can be shaped to positively engage the tab 86 of the non-circular apertures 66*c* to prevent the rotation of the pins 46*c* relative to the planetary gear set 14*d*.

A spring 56*d*, such as a coil spring, can be positioned inside the planet gear pins 46*d*. The spring 56*d* can generate a linear force the vector of which is substantially parallel to the axis of rotation 20. The linear force can be translated into a radial force directed toward the planet gear pin 46*d* by the tab 86 of the carrier plate 40*d*, 42*d*. The tab 86 can have a distal end 88 with an angled outer surface that is shaped to direct the spring force toward the planet gear pin 46*d*. The spring 56*d* can be compressed between two balls 90 inserted into the planet gear pin 46*d*. The spring can exert the linear force on the balls 90 in opposite directions such that each ball engages and exerts force on the outer surface of the distal end 88 of the tab 86. The ball 90 can move relative to the outer surface of the distal end 86 and urge the planet pin 46*d* toward the ring gears 30, 32.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electrically-actuated variable camshaft timing (VCT) phaser assembly, comprising:
a sun gear configured to receive input from an electric motor and one or more planet gears having radially-outwardly-extending gear teeth that engage the sun gear;
a first ring gear, having radially-inwardly extending gear teeth that engage the radially-outwardly-extending gear teeth of the planet gear(s), configured to receive rotational output provided by a crankshaft;
a second ring gear, having radially-inwardly extending gear teeth that engage the radially-outwardly-extending gear teeth of the planet gear(s), configured to couple to a camshaft;
one or more planet gear pins that carry the planet gear(s) and engage a carrier plate to prevent a relative rotation of the planet gear pin(s) relative to the carrier plate; and
one or more springs that bias the planet gear pin(s) and the planet gear(s) toward the first ring gear and the second ring gear, wherein the planet gear pin(s) include(s) a hollow cavity, the planet gear pin(s) having a first end and a second end and receive(s) the one or more springs which extend from the first end of the one or more planet gear pins to the second end of the one or more planet gear pins.

2. The electrically-actuated VCT phaser assembly recited in claim 1, further comprising an inner carrier plate as the carrier plate having an aperture with a radially-extending tab and an outer carrier plate having an aperture with a radially-extending tab, wherein the one or more springs passes through the aperture of the inner carrier plate or the outer carrier plate and engages the radially-extending tab of the inner carrier plate or the outer carrier plate.

3. The electrically-actuated VCT phaser assembly recited in claim 1, wherein a distal end of the one or more springs engages notches in an outer carrier plate as the carrier plate and an inner carrier plate.

4. The electrically-actuated VCT phaser assembly recited in claim 1, further comprising an outer carrier plate as the carrier plate including one or more apertures and an inner carrier plate with one or more apertures, wherein the apertures of the outer carrier plate or the inner carrier plate include a radially-extending tab that engages with the one or more planet gear pins to prevent angular movement of the one or more planet gear pins relative to the outer carrier plate and the inner carrier plate.

5. An electrically-actuated variable camshaft timing (VCT) phaser assembly, comprising:
a sun gear configured to receive input from an electric motor and one or more planet gears having radially-outwardly-extending gear teeth that engage the sun gear;
a first ring gear, having radially-inwardly extending gear teeth that engage the radially-outwardly-extending gear teeth of the planet gear(s), configured to receive rotational output provided by a crankshaft;
a second ring gear, having radially-inwardly extending gear teeth that engage the radially-outwardly-extending gear teeth of the planet gear(s), configured to couple to a camshaft;
an outer carrier plate having apertures;
an inner carrier plate having apertures;
one or more planet gear pins that engage the inner carrier plate or the outer carrier plate to prevent the relative rotation of the one or more planet gear pin(s) relative to the inner carrier plate or the outer carrier plate, wherein the one or more planet gear pin(s) are received by the apertures of the inner carrier plate or the outer carrier plate that permit radial movement of the one or more planet gear pin(s);
one or more spring slots in the outer carrier plate and the inner carrier plate; and
one or more springs, received by the one or more spring slots in the outer carrier plate and the inner carrier plate, that bias the one or more planet gear pin(s) and the planet gear(s) toward the first ring gear and the second ring gear, wherein the one or more spring slots are located on one side of the one or more planet gear pin(s) and the apertures of the inner carrier plate or the outer carrier plate are located on an opposite side of the one or more planet gear pin(s).

6. The electrically-actuated VCT phaser assembly recited in claim 5, wherein the one or more planet gear pin(s) further comprise(s) a planar surface that abuts a planar surface of the apertures formed in the outer carrier plate and the inner carrier plate.

7. The electrically-actuated VCT phaser assembly recited in claim 5, wherein the one or more springs comprises a leaf spring.

8. The electrically-actuated VCT phaser assembly recited in claim 5, further comprising a bushing or a bearing positioned between the one or more planet gear pin(s) and the one or more planet gears.

9. An electrically-actuated variable camshaft timing (VCT) phaser assembly, comprising:
   a sun gear configured to receive input from an electric motor and one or more planet gears having radially-outwardly-extending gear teeth that engage the sun gear;
   a first ring gear, having radially-inwardly extending gear teeth that engage the radially-outwardly-extending gear teeth of the one or more planet gears, configured to receive rotational output provided by a crankshaft;
   a second ring gear, having radially-inwardly extending gear teeth that engage the radially-outwardly-extending gear teeth of the one or more planet gears, configured to couple to a camshaft;
   an outer carrier plate;
   an inner carrier plate;
   apertures in the outer carrier plate and the inner carrier plate, wherein the apertures in at least one of the outer carrier plate or the inner carrier plate includes a radially-extending tab; and
   one or more planet gear pin(s) that engage the radially-extending tab to prevent a relative rotation of the one or more planet gear pins relative to the outer carrier plate and the inner carrier plate, wherein the planet gear pins are received by the apertures that permit radial movement of the planet gear pin(s);
   a spring that biases the planet gear pin(s) and the planet gear(s) toward the first ring gear and the second ring gear, wherein the planet gear pin(s) include(s) a hollow cavity and receive(s) the spring within the hollow cavity.

10. The electrically-actuated VCT phaser assembly recited in claim 9, further comprising a second radially-extending tab included in the apertures.

11. The electrically-actuated VCT phaser assembly recited in claim 10, wherein the second radially-extending tab is axially spaced from the radially-extending tab.

12. The electrically-actuated VCT phaser assembly recited in claim 9, wherein the radially-extending tab further comprises an angled distal end that engages a ball opposably biased toward the radially-extending tab by the spring.

13. The electrically-actuated VCT phaser assembly recited in claim 9, wherein the spring is a coil spring.

14. The electrically-actuated VCT phaser assembly recited in claim 9, wherein a distal end of the spring abuts the radially-extending tab.

15. An electrically-actuated variable camshaft timing (VCT) phaser assembly, comprising:
   a sun gear configured to receive input from an electric motor and one or more planet gears having radially-outwardly-extending gear teeth that engage the sun gear;
   a first ring gear, having radially-inwardly extending gear teeth that engage the radially-outwardly-extending gear teeth of the planet gear(s), configured to receive rotational output provided by a crankshaft;
   a second ring gear, having radially-inwardly extending gear teeth that engage the radially-outwardly-extending gear teeth of the planet gear(s), configured to couple to a camshaft;
   one or more planet gear pins that carry the planet gear(s) and engage a portion of the electrically-actuated VCT phaser assembly to prevent the relative rotation of the planet gear pin(s) about a central axis of each planet gear pin of the one or more planet gear pins relative to an inner carrier plate or an outer carrier plate; and
   one or more springs that bias the planet gear pin(s) and the planet gear(s) toward the first ring gear and the second ring gear, wherein the one or more springs is axially positioned in between the inner carrier plate or the outer carrier plate, and a radial face of the planet gear(s).

16. The electrically-actuated VCT phaser assembly recited in claim 15, wherein the planet gear pin(s) further comprise(s) a planar surface that abuts a planar surface of apertures formed in the outer carrier plate and the inner carrier plate.

17. The electrically-actuated VCT phaser assembly recited in claim 15, further comprising a hushing or a bearing positioned between the one or more planet gear pins and the planet gear(s).

18. The electrically-actuated VCT phaser assembly recited in claim 15, wherein the one or more springs is a snap ring that abuts the one or more planet gear pins.

\* \* \* \* \*